United States Patent
Ueda et al.

(10) Patent No.: US 7,155,011 B2
(45) Date of Patent: Dec. 26, 2006

(54) ENCRYPTION METHOD, DECRYPTION METHOD, AND RECORDING AND REPRODUCING APPARATUS

(75) Inventors: Kenjiro Ueda, Kanagawa-ken (JP); Takayuki Sugahara, Kanagawa-ken (JP); Wataru Inoha, Kanagawa-ken (JP); Seiji Higurashi, Tokyo (JP); Toshio Kuroiwa, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 1036 days.

(21) Appl. No.: 10/092,544

(22) Filed: Mar. 8, 2002

(65) Prior Publication Data
US 2002/0131595 A1    Sep. 19, 2002

(30) Foreign Application Priority Data

| Mar. 13, 2001 | (JP) | ........................... P2001-070011 |
| Mar. 13, 2001 | (JP) | ........................... P2001-070012 |
| Oct. 9, 2001 | (JP) | ........................... P2001-311114 |
| Oct. 9, 2001 | (JP) | ........................... P2001-311117 |

(51) Int. Cl.
*H04K 1/04* (2006.01)
*H04K 1/06* (2006.01)

(52) U.S. Cl. ........................... 380/37; 380/36; 380/201; 380/259; 380/261; 713/168; 726/30

(58) Field of Classification Search ..................... None
See application file for complete search history.

(56) References Cited

U.S. PATENT DOCUMENTS

| 5,058,164 A | * | 10/1991 | Elmer et al. | ................. 713/190 |
| 5,224,164 A | * | 6/1993 | Elsner | ........................... 380/44 |
| 5,742,686 A | * | 4/1998 | Finley | ........................... 380/28 |

(Continued)

FOREIGN PATENT DOCUMENTS

JP          07-303102          11/1995

(Continued)

OTHER PUBLICATIONS

Wohlmacher, P., 'Introduction to the Taxonomy of Multiple Cryptography', Multimedia andSecurity Workshop, ACM '99, Oct. 1999, pp. 7-15, wwwiti.cs.uni-magdeburg.de/iti_amsl/acm/acm99/GMD_report.pdf.*

*Primary Examiner*—Nasser Moazzami
*Assistant Examiner*—Ronald Baum
(74) *Attorney, Agent, or Firm*—Nath & Associates PLLC; Gary M. Nath; Gregory B. Kang

(57) ABSTRACT

The present invention relates to an encryption method for encrypting information including a series of multiple unit blocks, one at a time, a decryption method for decrypting multiple encrypted unit blocks, one at a time, and a recording and reproducing apparatus that uses those methods. The seed of an encryption key for encrypting each unit block and the seed of an encryption key for decrypting each encrypted unit block, which are used by those methods and the recording and reproducing apparatus, are based on a unit block that is one or more unit blocks before the current unit block in a reproduction order or on information generated by encrypting one or more unit blocks before the current unit block. Alternatively, the seed of an encryption key for encrypting each unit block and the seed of an encryption key for decrypting each encrypted unit block are information based on an encryption key for encrypting a unit block before the current unit block in a reproduction order.

8 Claims, 13 Drawing Sheets

U.S. PATENT DOCUMENTS

| | | | | |
|---|---|---|---|---|
| 6,011,849 A | * | 1/2000 | Orrin | 380/42 |
| 6,064,738 A | * | 5/2000 | Fridrich | 380/28 |
| 6,269,163 B1 | * | 7/2001 | Rivest et al. | 380/28 |
| 6,353,672 B1 | * | 3/2002 | Rhoads | 382/100 |
| 6,845,159 B1 | * | 1/2005 | Domstedt et al. | 380/44 |
| 2002/0073326 A1 | * | 6/2002 | Fontijn | 713/190 |

FOREIGN PATENT DOCUMENTS

| | | |
|---|---|---|
| JP | 09-107536 | 4/1997 |
| JP | 2000-149417 | 5/2000 |

* cited by examiner

ENCRYPTION METHOD, DECRYPTION METHOD, AND RECORDING AND REPRODUCING APPARATUS

BACKGROUND OF THE INVENTION

1. Field of the Invention

The present invention relates to an encryption method for encrypting playback-limited contents, a decryption method for decrypting encrypted playback-limited contents, and a recording and reproducing apparatus that encrypts playback-limited contents and that records/reproduces the encrypted playback-limited contents.

2. Description of the Related Art

Conventionally, contents such as video data or audio data are recorded on a tape recording medium such as a video tape or an audio tape or on a disc recording medium such as a CD or a DVD. One of the problems with those media is that contents are sometimes illegally copied from those media through dubbing.

In addition, with the introduction of a digital method for recording video or audio data, contents are not only recorded on the media described above but also distributed through the data distribution function. This makes illegal copy protection more critical.

Next, how the copy of digital contents data is limited will be described. As more and more video or audio data is digitally distributed recently as described above, contents providers that distribute contents have placed a playback limitation on them such as "copy prohibition" or "single-copy permission." Such digital contents data has the copy guard signal inserted into the contents to distort the contents image if a user, who has copied the contents, tries to display them.

A typical system using the above method is a macro vision system (pseudo sync pulse system, color stripe system). This system inserts special signals into a particular portion of the analog signals of "copy prohibited" contents to allow a recorder to record the contents while identifying the signals inserted into the particular portion. Therefore, when an attempt is made to reproduce the contents, the signals described above distort the image on the screen to make it difficult to view. In addition, when an attempt is made using a digital recorder to record contents using this copy guard system, the recorder detects those signals and does not record the contents. A digitally broadcast PPV (Pay Per View) program uses this system.

However, contents using this copy guard system may be copied normally by simply removing the signals that distort the screen, and an apparatus for circumventing the copy guard has been on the market.

For "single-copy permitted" contents, the copy generation is managed to prevent the contents from being copied more times than are permitted. A typical system using this method is CGMS (Copy Generation Management System). In this system, a particular digital signal (three values, that is, 1. Copy prohibited, 2. Copy permitted for one generation only, 3. Unlimited copy permitted) is built into a particular portion of contents digital signals, and a digital recorder identifies this particular signal and places a limitation on the copy operation as instructed by the digital signal built into the contents. The CGMS system is used also for managing the copy generation of an MD (Mini Disc).

However, the copy guard of the CGMS system described above may also be disabled by changing the copy generation flag from "Copy prohibited" to "Copy permitted".

Considering those problems, the digital contents data itself is encrypted on a DVD before being recorded on the medium. Therefore, an attempt to obtain data from a DVD results in obtaining encrypted contents. In addition, because obtaining an encryption key is difficult, copying unencrypted digital signals becomes more difficult.

DES (Data Encryption Standard), one of those encryption systems, will be described. DES is a block encryption system where plain text (original text), encrypted text, and an encryption key are all 64 bits in size. Because 8 bits of the 64 bits of an encryption key are used for parity, the actual size of the encryption key is 56 bits.

FIG. 1 shows the basic configuration of DES. After exchanging the bits so that each two neighboring bits in the plain text are placed approximately 32 bits apart, the same transformation is performed for 16 stages repeatedly. In each stage, with the high-order 32 bits $L_{n-1}$ and low-order 32 bits $R_{n-1}$ each as a group, from the previous stage, they are transformed to $L_n$ and $R_n$ using a 48-bit key $K_n$ received from the key generator, and are output to the next stage. After exchanging $L_{16}$ and $R_{16}$ that are output from the 16th stage, encrypted text is output by replacing the bits through $IP^{-1}$.

On the other hand, the eight parity bits are removed from the key through selective replacement PC−1 and, at the same time, the remaining 56 bits are exchanged. After that, with the high-order 28 bits $C_n$ and low-order 28 bits $D_n$ each as a group, the key $K_n$ is created in each stage while repeating shifting in each of 16 stages. Each of the 16 transformers, which is the basic unit of DES shown in FIG. 1, has the structure shown in FIG. 2 where the input $(L_{n-1}, R_{n-1})$ from the previous stage and the output $(L_n, R_n)$ to the following stage satisfy the following relation:

$$L_n = R_{n-1}$$

$$R_n = L_{n-1} \text{ EXOR } f(R_{n-1}, K_n)$$

where EXOR indicates an exclusive OR and the function $f(R_{n-1}, K_n)$ has the structure shown in FIG. 3.

The input $R_{n-1}$ to the function f, 32 bits in length, is extended to 48 bits through extensive replacement E. Next, after calculating the exclusive OR of the 48 bits and $K_n$ on a bit basis, the result is divided into eight 6-bit units which are then input to boxes $S_1$–$S_8$. In each S box, the 6-bit input is non-linearly transformed to a 4-bit output. Finally, the bit positions of the 32 bits, composed of eight 4-bit outputs, are exchanged though the replacement P to produce the output, $f(R_{n-1}, K_n)$.

Solving the DES basic transformation expressions $$L_n = R_{n-1}$$

$$R_n = L_{n-1} \text{ EXOR } f(R_{n-1}, K_n)$$

and then representing $(L_{n-1}, R_{n-1})$ with $(L_n, R_n)$ gives the following expressions:

$$R_{n-1} = L_n$$

$$L_{n-1} = R_n \text{ EXOR } f(R_{n-1}, K_n) = R_n \text{ EXOR } f(L_n, K_n)$$

This indicates that $(R_{n-1}, L_{n-1})$ may be obtained from $(R_n, L_n)$ in the same way $(L_n, R_n)$ is obtained from $(L_{n-1})$. This property means that data may be decrypted in the same way data is encrypted.

However, although the contents of a "copy prohibited" PPV digital broadcasting program may be viewed only once, a viewer must view that program during a fixed period of time during which the PPV program is broadcast. That is, for "copy prohibited" contents, the copyright owner intends to allow a viewer to view the contents only once but, in practice, limits the period of time during which the contents may be viewed. In addition, in such a case where a viewer is allowed to record "copy prohibited" contents on a recording medium and view the contents only once, a system that prevents the viewer from playing back once-played contents has not yet established. Furthermore, a method for erasing already-played-back contents while reproducing the contents, which is required to implement the system described above, is difficult to implement. For example, when data is deleted from a hard disc of a personal computer, the contents of the FAT of the file system are erased but actual data is not.

On the other hand, for "single-copy permitted" contents, after the contents are recorded once on a VCR (Video Cassette Recorder) or a HDD (Hard Disc Drive) of a recording and reproducing apparatus, the contents cannot be copied any more because a copy that will be made becomes a second copy. This prevents the viewer, who has played back the contents, from recording only a desired program for recording onto another medium for saving. Thus, for "single-copy permitted" contents, although the copyright owner intends to limit a medium to a single medium on which the contents may be recorded, it is not permitted to record the once recorded contents onto another medium and then erase the recorded portion of the original recording medium, that is, so-called contents movement is not permitted.

An another problem is encryption; that is, advancement in computer power makes it easy to break an encryption key. Using a fixed key for one unit of contents means that, once the key is broken, all the contents may be decrypted and, as a result, digital contents may be copied illegally. One method for avoiding this is to change the key with time. This method prevents the whole contents from being decrypted even if a key used for encrypting a part of contents is broken and therefore ensures safety as compared with a case when a fixed key is used. In addition, the keys used for encryption must be calculated when generating a plurality of keys at decryption time, and those keys and their seeds must be stored separately. One problem with this method is that it requires a large amount of storage as the number of keys increases. The "seed of a key" means information by which the key is generated.

Additionally, a block-chain encryption processing method, such as the one disclosed in Japanese Patent Laid-Open Publication No. Hei 9-107536, uses the encryption function E1 to encrypt P(1) based on the encryption key K and the initial value IV, uses the encryption function E2 to seqeuntially encrypt P(i) ($2 \leq i \leq n$) based on the encryption key K and P(i-1), and generates encrypted data blocks (C(1), C(2), . . . , C(n)). However, in this method, because the encryption key K is fixed and because data on which encryption is based is data before being encrypted, there is a danger that encrypted text is decrypted.

SUMMARY OF THE INVENTION

In view of the foregoing, it is an object of the present invention to provide an encryption method, a decryption method, and a recording and reproducing apparatus that allow the playback limitations on digital contents data, such as "copy prohibition" and "single-copy permission", to function according to their original meaning and that significantly reduce the amount of storage in which key seeds are stored.

To achieve the above object, there is provided an encryption method for encrypting information including a plurality of continuous unit blocks having a reproduction order, the plurality of unit blocks being encrypted one unit block at a time, wherein a seed of an encryption key for encrypting a unit block is based on one or more unit blocks that are, in the reproduction order, before the unit block or on information generated by encrypting one or more unit blocks before the unit block.

In a preferred embodiment of the present invention, the seed of the encryption key is chained at least twice.

In a preferred embodiment of the present invention, the chain is reset when the seed is chained a predetermined number of times.

In a preferred embodiment of the present invention, an initial value IV of a seed of an encryption key used for encrypting a first unit block of the plurality of unit blocks having the reproduction order is stored, the chain has a plurality of hierarchy levels, a first hierarchy level is encrypted based on the initial value IV of the seed of the encryption key, and a second and higher hierarchy levels are encrypted based on a seed of an encryption key at a lower hierarchy level, the initial value IV of the seed of the encryption key that was stored is used when encrypted unit blocks from the first unit block to any given unit block of the encrypted information are decrypted for reproduction, and when the reproduction of the unit blocks to the given unit block ends, the initial value IV of the seed of the encryption key that was stored is erased and both a seed of an encryption key used for encrypting a unit block that follows the given unit block in the reproduction order and a seed of an encryption key used for encrypting a unit block at another hierarchy level after the given unit block are stored.

To achieve the above object, there is provided an encryption method for encrypting information including a plurality of continuous unit blocks having are production order, the plurality of unit blocks being encrypted one unit block at a time, wherein a seed of an encryption key for encrypting a unit block is information based on an encryption key used for encrypting a unit block that is, in the reproduction order, before the unit block to be encrypted.

To achieve the above object, there is provided a decryption method for decrypting information including a plurality of continuous encrypted unit blocks having a reproduction order, the plurality of encrypted unit blocks having being encrypted one unit block at a time, wherein a seed of an encryption key for decrypting an encrypted unit block is based on one or more unit blocks that are, in the reproduction order, before the unit block or on information generated by encrypting one or more unit blocks before the unit block.

In a preferred embodiment of the present invention, the seed of the encryption key is chained at least twice.

In a preferred embodiment of the present invention, the chain is reset when the seed is chained a predetermined number of times.

In a preferred embodiment of the present invention, an initial value IV of a seed of an encryption key used for encrypting a first unit block of the plurality of unit blocks having the reproduction order is stored, the chain has a plurality of hierarchy levels, a second hierarchy level is encrypted based on the initial value IV of the seed of the encryption key, and a third and higher hierarchy levels are encrypted based on a seed of an encryption key at a lower hierarchy level, the initial value IV of the seed of the encryption key that was stored is used when encrypted unit blocks from the first unit block to any given unit block of the encrypted information are decrypted for reproduction, and when the reproduction of the unit blocks to the given unit block ends, the initial value IV of the seed of the encryption key that was stored is erased and both a seed of an encryption key used for encrypting a unit block that follows the given unit block in the reproduction order and a seed of an encryption key used for encrypting a unit block at another hierarchy level after the given unit block are stored.

To achieve the above object, there is provided a decryption method for decrypting information including a plurality of continuous encrypted unit blocks having a reproduction order, the plurality of encrypted unit blocks having being encrypted one unit block at a time, wherein a seed of an encryption key for decrypting an encrypted unit block is information based on an encryption key used for decrypting a unit block that is, in the reproduction order, before the unit block to be decrypted.

To achieve the above object, there is provided a recording and reproducing apparatus comprising: encrypting means for encrypting information including a plurality of continuous unit blocks having a reproduction order, one unit block at a time; recording means for recording the encrypted information on a recording medium; and decrypting means for decrypting the plurality of encrypted unit blocks for reproduction, one unit block at a time, which are the encrypted information read from the recording medium, wherein a seed of an encryption key for encrypting a unit block and a seed of an encryption key for decrypting an encrypted unit block are based on one or more unit blocks that are, in the reproduction order, before the unit block or on information generated by encrypting one or more unit blocks before the unit block.

In a preferred embodiment of the present invention, the seed of the encryption key is chained at least twice.

In a preferred embodiment of the present invention, the chain is reset when the seed is chained a predetermined number of times.

In a preferred embodiment of the present invention, the recording and reproducing apparatus further comprises: storage means for storing an initial value IV of a seed of an encryption key used for encrypting a first unit block of the plurality of unit blocks having the reproduction order, wherein the initial value IV of the seed of the encryption key stored in the storage means is used when the first unit block of the plurality of unit blocks encrypted by the encrypting means and having the reproduction order is decrypted for reproduction.

In a preferred embodiment of the present invention, the recording and reproducing apparatus further comprises: storage means for storing an initial value IV of a seed of an encryption key used for encrypting a first unit block of the plurality of unit blocks having the reproduction order, wherein, when encrypted unit blocks from the first unit block to any given unit block, which are the encrypted information, are decrypted for reproduction, the initial value IV of the seed of the encryption key that was stored in the storage means is used, and wherein, when the reproduction of the unit blocks to the given unit block ends, the initial value IV of the seed of the encryption key is erased from the storage means and a seed of an encryption key used for encrypting a unit block that follows the given unit block in the reproduction order is stored.

In a preferred embodiment of the present invention, the recording and reproducing apparatus further comprises: storage means for storing an initial value IV of a seed of an encryption key used for encrypting a first unit block of the plurality of unit blocks having the reproduction order, wherein the chain has a plurality of hierarchy levels, a second hierarchy level is encrypted based on the initial value IV of the seed of the encryption key, and a third and higher hierarchy levels are encrypted based on a seed of an encryption key at a lower hierarchy level, wherein, when encrypted unit blocks from the first unit block to any given unit block of the encrypted information are decrypted for reproduction, the initial value IV of the seed of the encryption key that stored in the storage means is used, and wherein, when the reproduction of the unit blocks to the given unit block ends, the initial value IV of the seed of the encryption key is erased from the storage means and both a seed of an encryption key used for encrypting a unit block that follows the given unit block in the reproduction order and a seed of an encryption key used for encrypting a unit block at another hierarchy level after the given unit block are stored in the storage means.

To achieve the above object, there is provided a recording and reproducing apparatus comprising: encrypting means for encrypting information including a plurality of continuous unit blocks having a reproduction order, one unit block at a time; recording means for recording the encrypted information on a recording medium; and decrypting means for decrypting the plurality of encrypted unit blocks for reproduction, one unit block at a time, which are the encrypted information read from the recording medium, wherein a seed of an encryption key for encrypting a unit block and a seed of an encryption key for decrypting an encrypted unit block are information based on an encryption key used for encrypting a unit block that is, in the reproduction order, before the unit block to be encrypted or decrypted.

The nature, principle and utility of the invention will become more apparent from the following detailed description when read in conjunction with the accompanying drawings.

DESCRIPTION OF THE PREFERRED EMBODIMENTS

An embodiment of an encryption method, a decryption method, and a recording and reproducing apparatus according to the present invention will be described below with reference to the drawings. In the description below, it is assumed that digital contents data sent from a broadcasting station is AV (Audio Visual) data and that the data is "copy prohibited". In the example, a hard disc recorder is used as an example of a recording and reproducing apparatus that allows the user to play back the program only once at any time after the time during which the program was really broadcast.

In this embodiment, such a hard disc recorder is implemented by allowing "copy prohibited" contents to be played back only once. An MPEG (Moving Picture Experts Group) recorded transport stream (TS) is recorded on the hard disc. DES is used for encryption/decryption.

Figure 1:
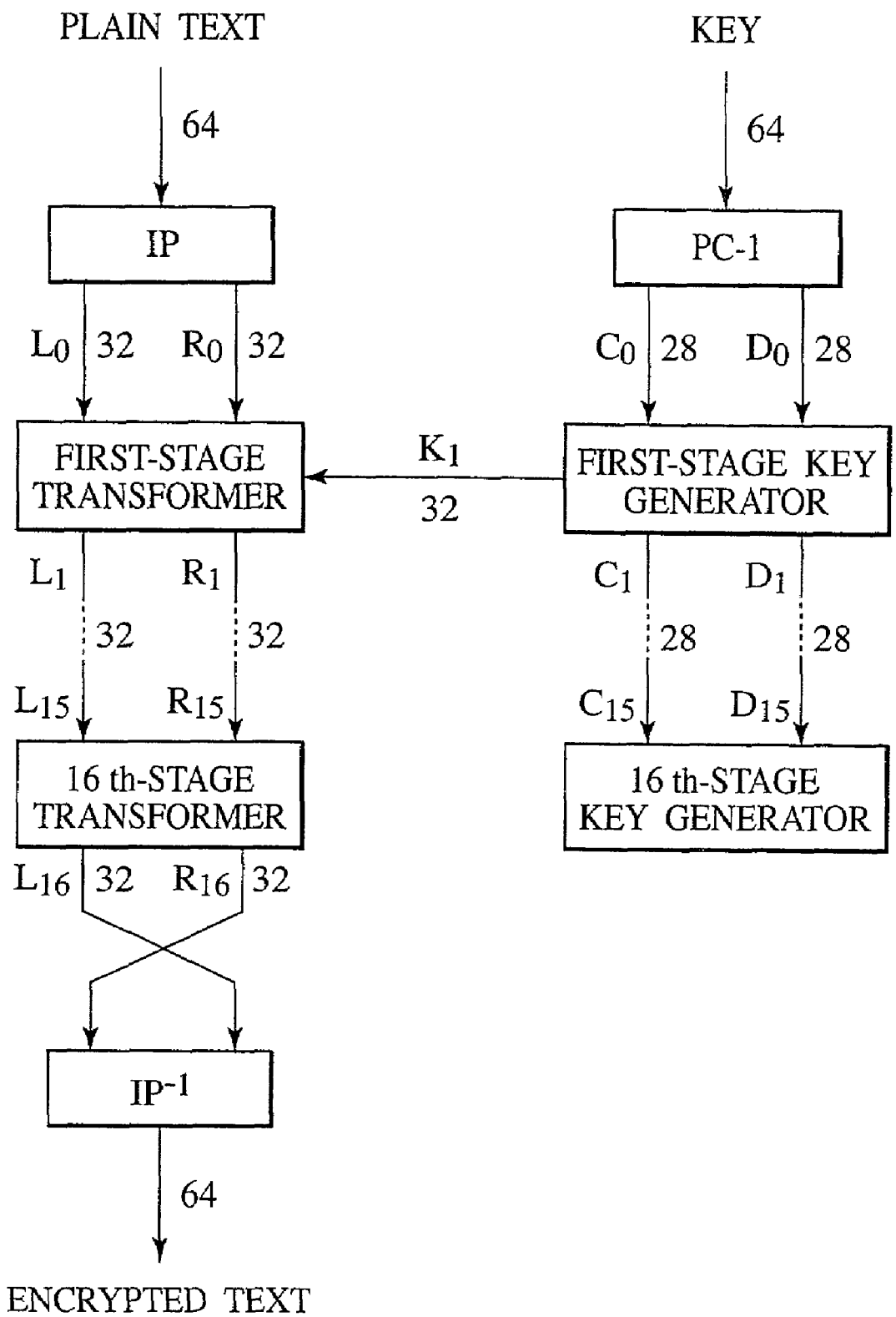
FIG. 1 is a diagram showing the basic configuration of DES.
Figure 2:
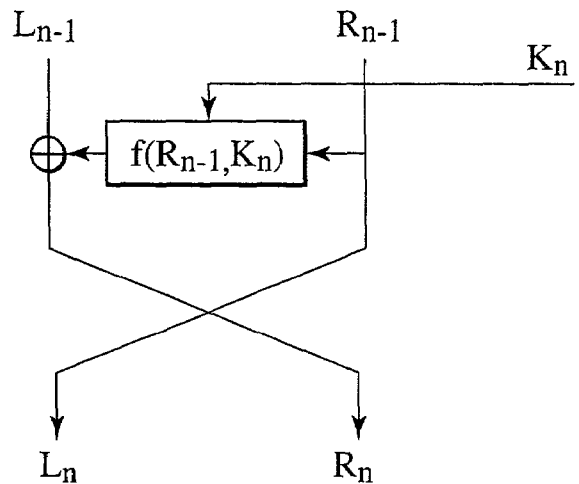
FIG. 2 is a diagram showing the structure of one of 16 transformers that is a basic unit of DES.
Figure 3:
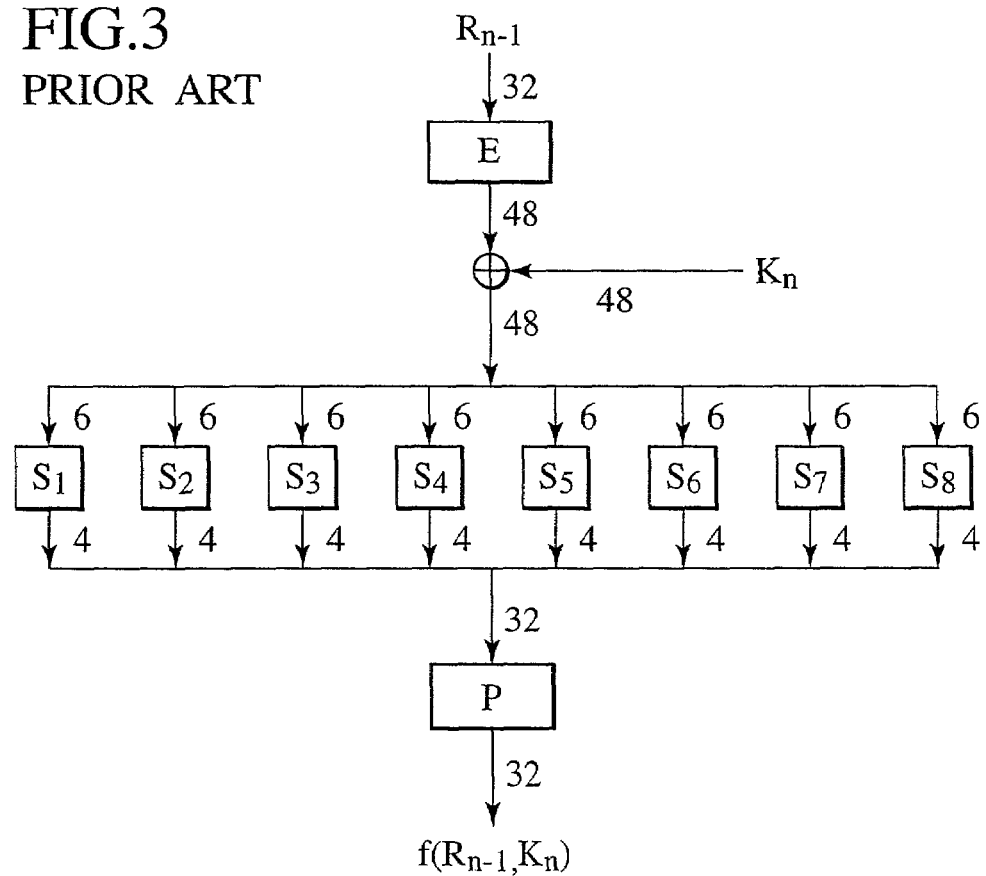
FIG. 3 is a diagram showing the structure of a function f used by DES.
Figure 4:
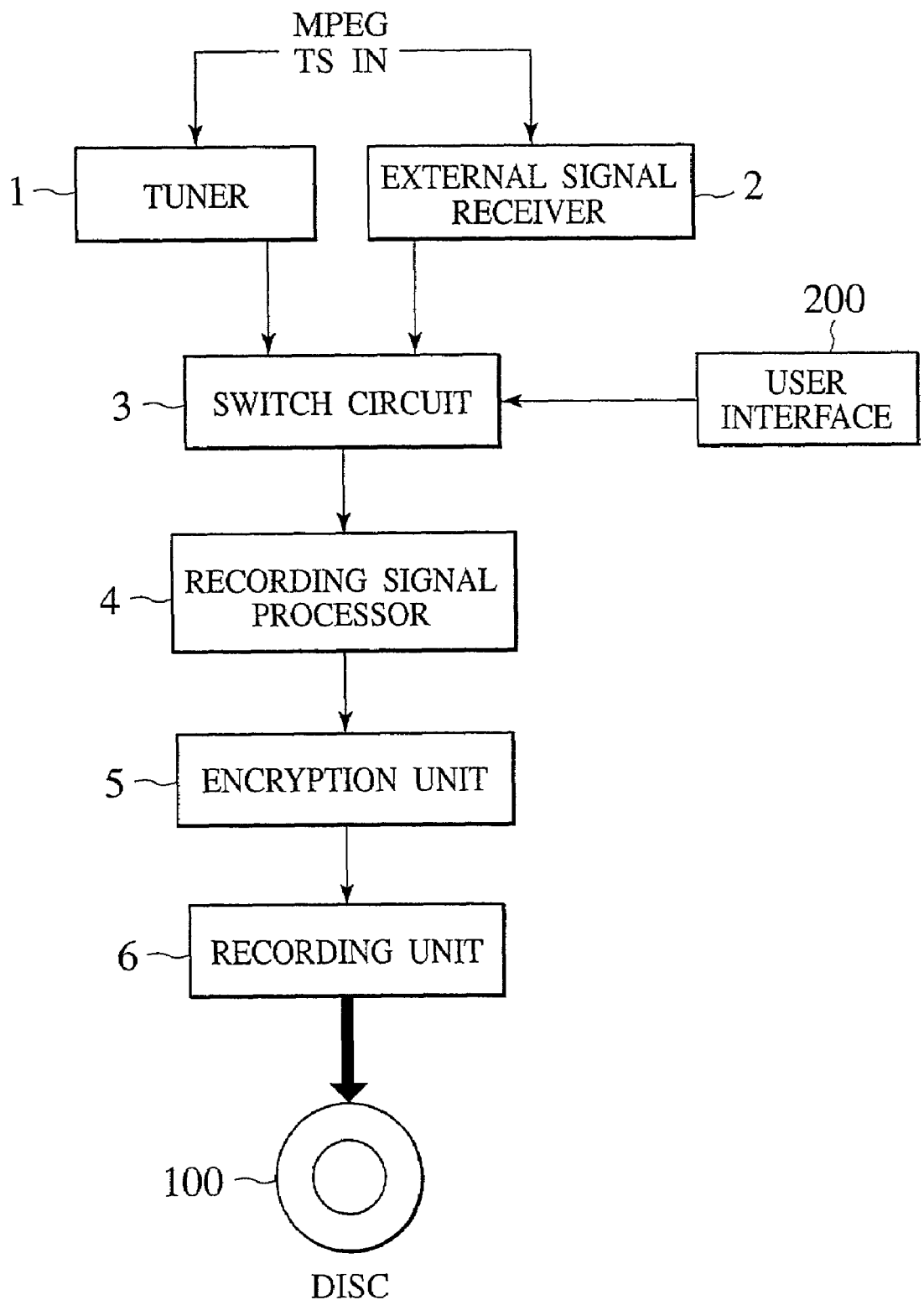
FIG. 4 is a block diagram showing the configuration of a recording unit of a hard disc recorder to which an encryption method according to the present invention is applied.

FIG. 4 is a diagram showing a recording unit of the hard disc recorder in which an encryption unit, to which the encryption method according to the present invention is applied, is included. An MPEG TS is received via a tuner 1 or an external signal receiver 2 and is sent to a switch circuit 3. This circuit sends the signals either from the tuner 1 or from the external signal receiver 2 to a recording signal processor 4 in response to an instruction from a user interface 200. A time code, an absolute track number, and so on are generated for the signals sent to the recording signal processor 4. After that, the signals are sent to an encryption unit 5 to encrypt data. Then, a recording unit 6 records encrypted data on a disc 100. Video signals and audio signals are recorded on the disc 100 with the time code and so on, for example, in sub-code areas.

Figure 5:
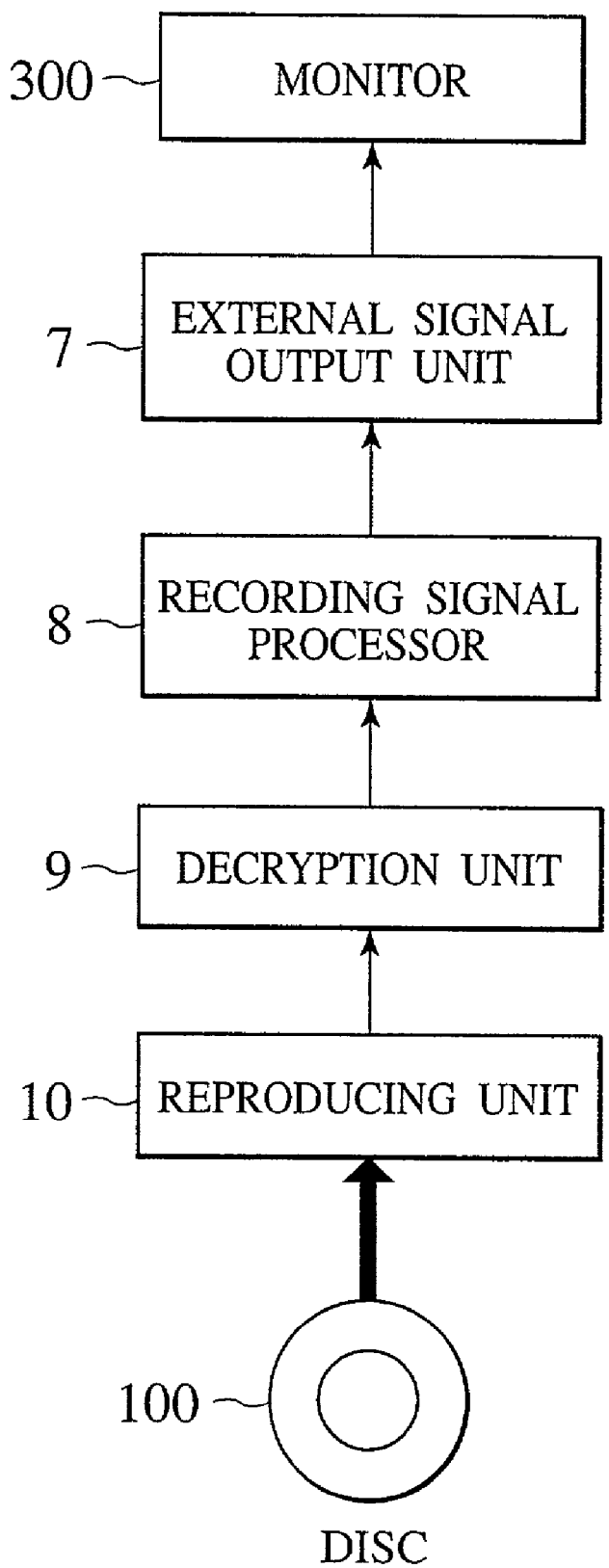
FIG. 5 is a block diagram showing the configuration of a reproducing unit of a hard disc recorder to which a decryption method according to the present invention is applied.

FIG. 5 is a diagram showing a reproducing unit of the hard disc recorder in which a decryption unit, to which the decryption method according to the present invention is applied, is included. First, a reproducing unit 10 reads signals from the disc 100 and sends the signals, which have been read, to a decryption unit 9. This unit decrypts data and sends the decrypted data to a reproducing signal processor 8. The reproducing signal processor 8 performs error correction and so on and outputs the signals to a monitor 300 via an external signal output unit 7.

When recording "copy prohibited" digital contents data on the hard disc recorder with the configuration shown in FIGS. 4 and 5, a signal indicating "copy prohibition" is recorded via CGMS described above. For example, a TS of digital broadcasting data includes a descriptor called a digital copy control descriptor which, in turn, includes a two-bit field containing digital recording control data (digital copy control information). Within that field is included control data having the value of, for example, "Copy Permitted"=00, "Single-Copy Permitted"=10, or "Copy Prohibited"=11. Upon detecting the two bits which contain "11" in the received signals, the hard disc recorder calculates the initial value $IV=h_i(Const_i)$ with $Const_i$ as an input to the initial vector generation function $h_i$, where $Const_i$ is constant in the same contents.

The initial value IV is the seed of the key used for encrypting the first unit block of the received contents. If the initial value IV is easily revealed, there is a possibility that encrypted contents may be interpreted. Therefore, the initial value IV should be recorded in a non-hard-disc, difficult-to-analyze medium. For example, a flash memory that is difficult to remove is used as the medium. In this case, when the unit block is 184 bytes in length, the key $K_1=g(IV, Const)$ is calculated with the initial value IV as the input to the key generation function g. In the description below, $K_i$ indicates a key used to encrypt/decrypt the i-th block. Also, Const indicates other information used as the source of key generation. If Const information changes with time in the same contents, the Const information must be stored. In addition, if the information changes with time, a large amount of flash memory is required to store all changed information. Therefore, a parameter that is constant in the same contents, for example, an ID unique to the hard disc is used as Const. Encryption/decryption, which uses DES, requires a 56-bit key $K_i$. Therefore, the total of the bits of the initial value IV and Const should be 56 bits or more. This is because, if the key generation function g is a one-to-one function, the initial value IV and Const are easily inferred from the key $K_i$. Therefore, the key generation function g should be a $n(n \geq 2)$-to-one function.

Figure 6:
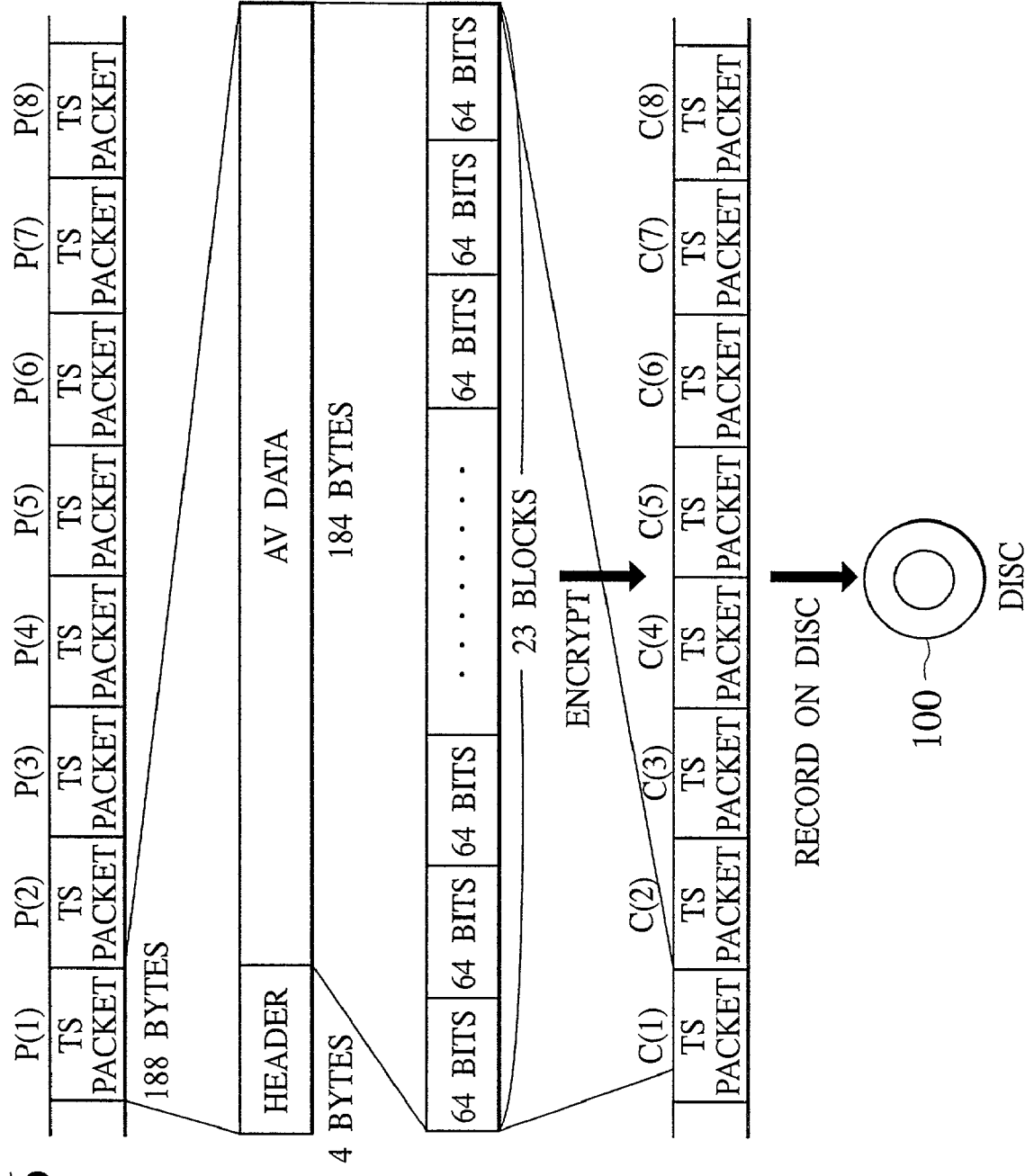
FIG. 6 is a diagram showing the configuration of an MPEG-coded TS used by the encryption method according to the present invention and the concept of encryption.

Next, the encryption method according to the present invention will be described with reference to FIG. 6. One TS packet, 188 bytes in length, is composed of a 4-byte header and a 184-byte unit block in which AV data is recorded. The 184-byte AV data in TS packet P(1) is composed of 23 DES-encrypted blocks each composed of 64 bits. Those 23 blocks are encrypted using the encryption key $K_1$ of TS packet P(1). The encrypted P(1) is described as C(1). TS packets P(2), P(3), and so on are processed in the same manner.

Next, how to create key $K_2$ used to encrypt P(2) and how to encrypt and decrypt data using key $K_2$ will be described. The present invention uses the two methods described below for this procedure.

The first method will be described. First, key $K_2$ is defined as $K_2=g(S_1, Const)$, where $S_1$ is defined as $S_i=h(P_{(i)})$ where h is a key seed generation function. That is, the plain text in the unit block immediately before the current block is used as the key seed. This makes the key variable from block to block and, even if one key is revealed, decoding all plain text is difficult. Another method for making the key variable is to prepare multiple key seeds, but this method requires all key seeds to be stored separately. By contrast, the method according to the present invention uses plain text, which is obtained by decrypting encrypted text recorded on the hard disc, as the variable part of the key seed, which is difficult to be analyzed and need not be stored in a separate area. Key $K_3$ and the following keys are also defined as $K_3=g(S_2, Const)$, $K_4=g(S_3, Const)$, and so on.

Figure 7:
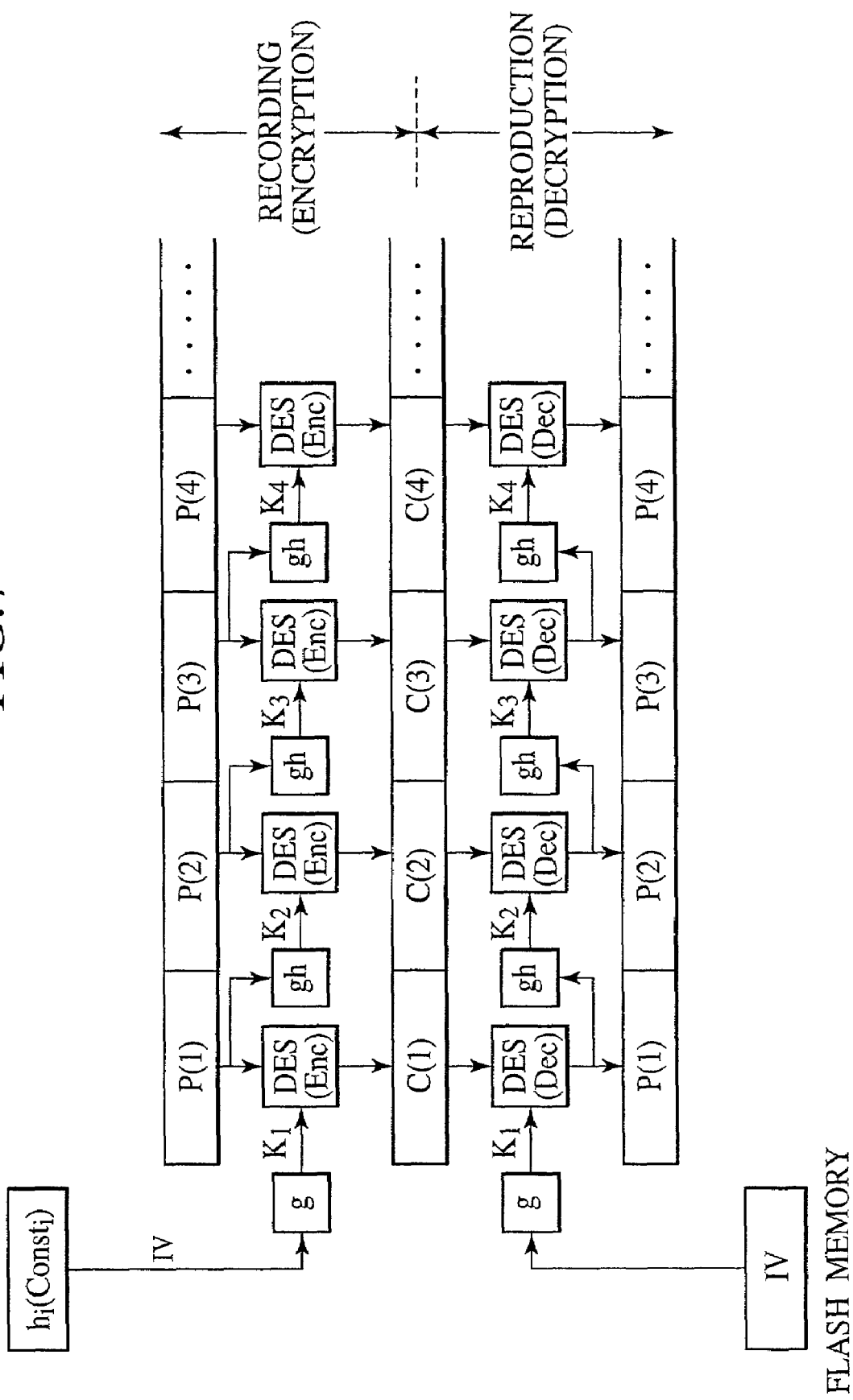
FIG. 7 is a diagram showing encryption and decryption by a first method of the encryption method, the decryption method, and a recording and reproducing apparatus according to the present invention.

To reproduce the contents, the initial value IV is read from the flash memory to generate key $K_1$ for decrypting $C(1)$. At that time, $S_1$ is also generated from $P(1)$ at the same time. Then, key $K_2$ is generated from $S_1$ for decrypting $C(2)$. FIG. 7 shows the overview of encryption and decryption in the first method. Although generated from the unit block immediately before the current block in the embodiment described above, the seed of the encryption key of a unit block may be generated from any unit block before the unit block. For example, the unit block that is two blocks before the current block may be used.

Next, the second method will be described. Like the first method described above, key $K_2$ is defined as $K_2=g(S_1, Const)$. The difference from the first method described above is that $S_1$ is defined as $S_i=h(K_i)$, where h is the key seed generation function. That is, the encryption key/decryption key of the unit block immediately before the current block is used as the key seed. This makes the encryption key variable from block to block and, even if one encryption key is revealed, decoding all plain text is difficult. Another method for making the encryption key variable is to prepare multiple key seeds of the encryption key, but this method requires all key seeds to be stored separately. By contrast, the method according to the present invention calculates the seed of an encryption key based on an encryption key and a decryption key that are not recorded on the hard disc. Therefore, the key seed is difficult to be analyzed and, in addition, need not be stored in a separate area. Key $K_3$ and the following keys are also defined as $K_3=g(S_2, Const)$, $K_4=g(S_3, Const)$, and so on.

Figure 8:
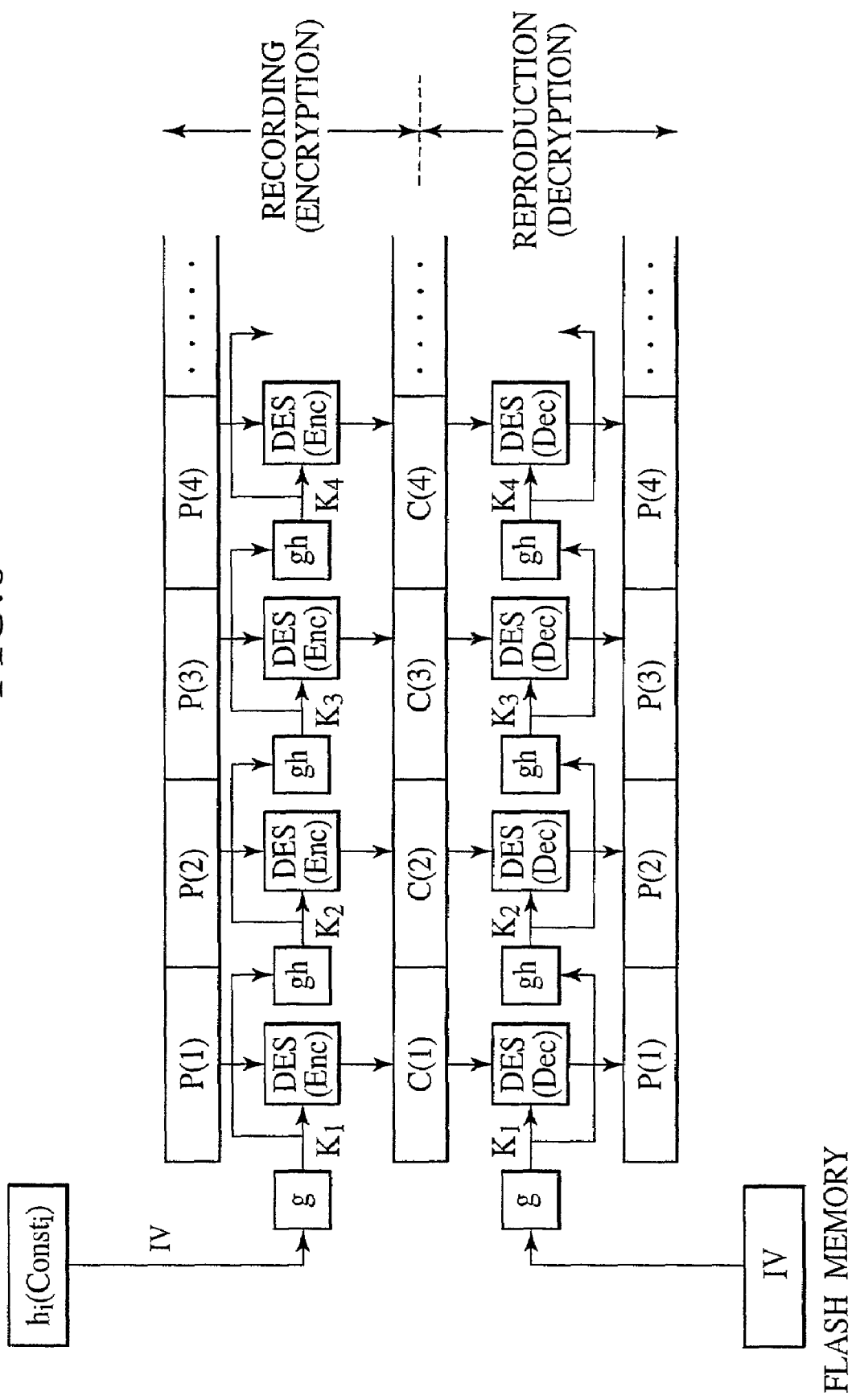
FIG. 8 is a diagram showing encryption and decryption by a second method of the encryption method, the decryption method, and a recording and reproducing apparatus according to the present invention.

To reproduce the contents, the initial value IV is read from the flash memory to generate key $K_1$ for decrypting $C(1)$ as in the first method described above. At that time, $S_1$ is also generated from the key $K_1$ at the same time. Then, key $K_2$ is generated from $S_1$ for decrypting $C(2)$. FIG. 8 shows the overview of encryption and decryption in the second method. Although, in the example described above, the seed of the encryption key of a unit block is generated from the encryption/decryption key of one unit block, the seed of a key may be generated from a plurality of unit blocks, for example, from the encryption keys/decryption keys of the unit blocks that are one block and two blocks before the current block. In addition, although generated from the encryption key/decryption key of the unit block immediately before the current block in the above example, the key seed may be generated from the encryption key/decryption key of the unit block that is two blocks before the current block.

Figure 9:
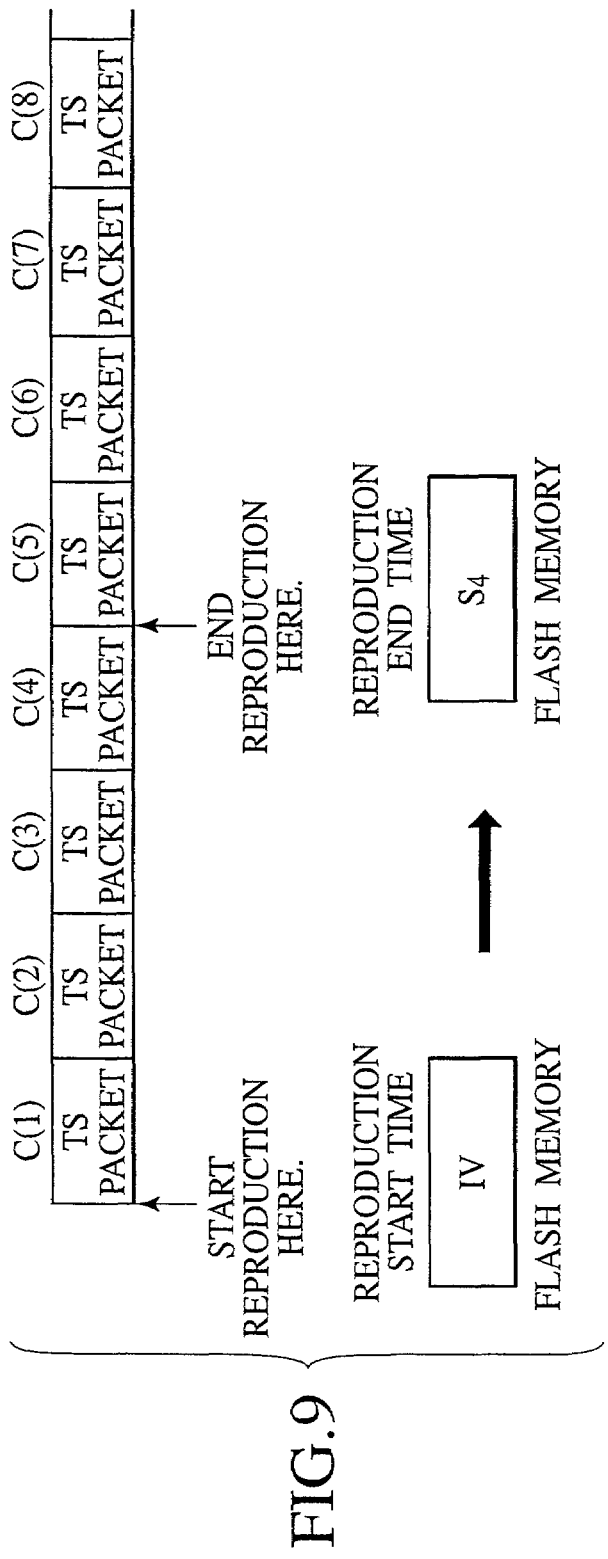
FIG. 9 is a diagram showing a method for reproducing contents encrypted by the encryption method according to the present invention.

Next, a method will be described that prevents once-reproduced portion from being reproduced again when "copy prohibited" contents are half reproduced. In the description below, it is assumed that TS packets $C(1)$ to $C(4)$ will be reproduced as shown in FIG. 9. As described above, the initial value IV is read first to start decryption beginning with $C(1)$. Reproduction ends when the decryption of $C(4)$ ends. At this point, to prevent $C(1)$ to $C(4)$ from being reproduced next time, the initial value IV is erased from the flash memory. This prevents key $K_1$, which is required for decrypting $C(1)$, from being generated. However, to start reproduction beginning with $C(5)$ next time, seed $S_4$ of key $K_5$ for decrypting $C(5)$ must be recorded. Therefore, immediately after reproduction begins, the initial value IV is erased from the flash memory or, if necessary, moved later to the buffer. When reproduction ends, $S_4$ is recorded in the flash memory. By doing so, $C(1)$ to $C(4)$ cannot be decrypted next time and therefore cannot be reproduced. On the other hand, $S_4$ and the start address of $P(5)$ are recorded in the flash memory to allow $C(5)$ and the following packets to be reproduced next time. Although $S_i$ is used in this example as the seed of key $k_{i+1}$ used for decrypting $C(i+1)$, two initial values, $IV_1$ and $IV_2$, may be provided to allow $S_i$ to be used as the seed of the key $K_{i+2}$ used for decrypting $C(i+2)$. Similarly, by providing three, four, and more initial value IVs, $S_i$ may be used as the seed of the key for decrypting the unit block that is three blocks and four blocks ahead. In addition, a plurality of seeds, $S_i$ and $S_{i+1}$, may be used as the seed of $K_{i+2}$, that is, two or more units of plain text before the current block may be used to generate a key. In the description below, the condition in which $S_i$ is the seed of $K_{i+1}$, $S_{i+1}$, is the seed of $K_{i+2}$, and so on, is called "chained."

Originally, the user is allowed to view "copy prohibited" contents only once at the time the contents are broadcast. Therefore, rewinding a once-reproduced portion for viewing may not be permitted because the copyright owner does not grant that action. However, although it is natural that current "copy prohibited" contents cannot be rewound for playback, it is possible to play them back from halfway through. Therefore, with the "copy prohibited" contents recorded on the hard disc recorder, the user is sometimes allowed to only fast-forward the contents. The problem is fast-forwarding the contents in the method described above always requires decryption to start from $C(1)$ even when the contents are on a hard disc that is accessed fast and randomly. Thus, if the user wants to play back only the last half of the contents, it takes a very long time until access is made to the part of the contents to be played back. To solve this problem, the configuration described below should be used.

Figure 10:
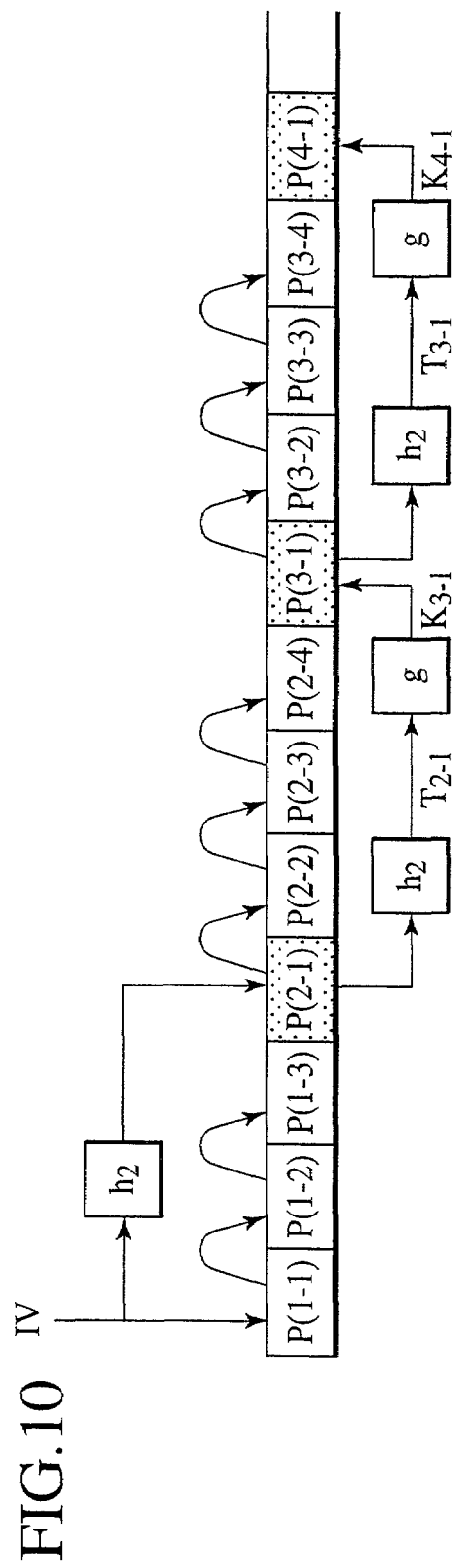
FIG. 10 is a diagram showing an example of encryption by the first encryption method according to the present invention.

First, the configuration used in the first method described above will be described with reference to FIG. 10.

An arrow in the figure indicates that the information at the starting point of the arrow is used as the seed of a key used to encrypt information pointed to by the arrow. The chain of the neighboring blocks is sequentially reset and, instead, block $P(2-1)$ is provided next to the last block whose chain is reset. $P(2-1)$ is encrypted using the key generated with the initial value IV as the seed. $P(2-1)$ becomes the seed of the encryption key of both $P(2-2)$ and $P(3-1)$. For example, when accessing $P(3-4)$, this configuration reduces the access time because the decryption is performed in the order of the initial value IV→$P(2-1)$→$P(3-1)$→$P(3-2)$→$P(3-3)$→$P(3-4)$. This configuration is called hereinafter a configuration with two "hierarchy levels". In this configuration, the hierarchy level composed of $P(2-1)$, $P(3-1)$, $P(4-1)$, and so on is called the "second hierarchy level". Although there are two hierarchy levels in the above embodiment, three or more hierarchy levels are also possible. However, three or more hierarchy levels reduce the random access time but complicate the encryption/decryption method. In the description below, the function that generates the seed of the encryption/decryption key of the unit blocks in the first hierarchy level is described as $h_1$, the function that generates the seed of the encryption/decryption key of the unit blocks in the second hierarchy level is described as $h_2$, and so on. In addition, the seed of the key $K_{3-1}$ generated from P(2-1) in the second hierarchy level is $T_{2-1}$, the seed of the key $K_{4-1}$ generated from P(3-1) is $T_{3-1}$, and so on.

Figure 11:
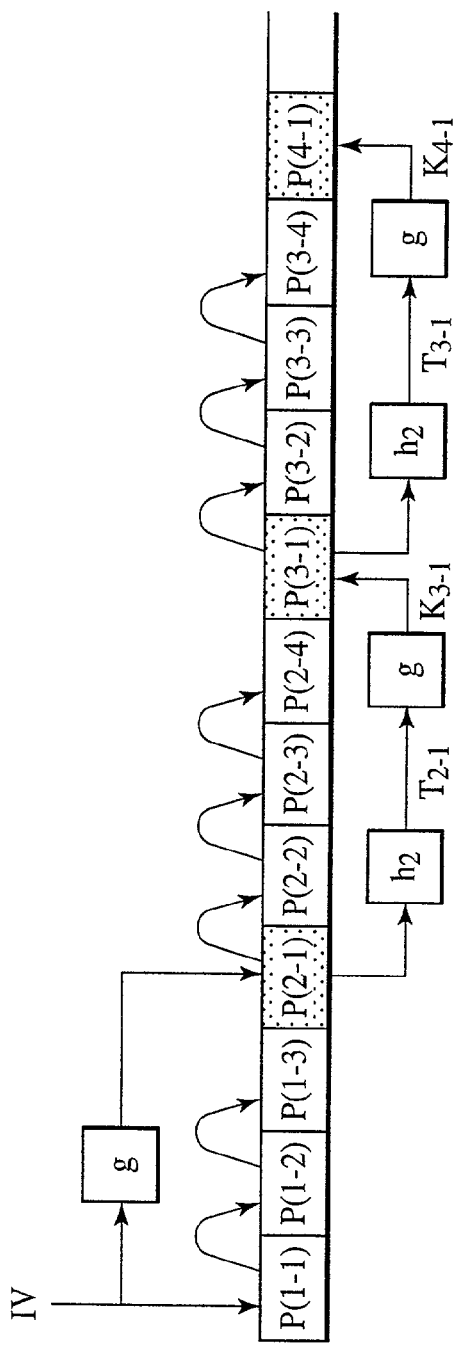
FIG. 11 is a diagram showing an example of encryption by the second encryption method according to the present invention.

Next, the configuration used in the second method described above will be described with reference to FIG. 11. The difference between the first method and the second method is understood easily by referring also to FIG. 8. In the first method, P(2-1) is the seed of the encryption key of P(2-2) and P(3-1); in the second method, $K_{2-1}$ is the seed of the encryption key of P(2-2) and P(3-1). In addition, in the first method, the seed of key $K_{3-1}$ generated from P(2-1) in the second hierarchy level is $T_{2-1}$, the seed of key $K_{4-1}$ generated from P(3-1) is $T_{3-1}$, and so on; in the second method, the seed of key $K_{3-1}$ generated from $K_{2-1}$ in the second hierarchy level is $T_{2-1}$, the seed of key $K_{4-1}$ generated from $K_{3-1}$ is $T_{3-1}$, and so on.

Figure 12:
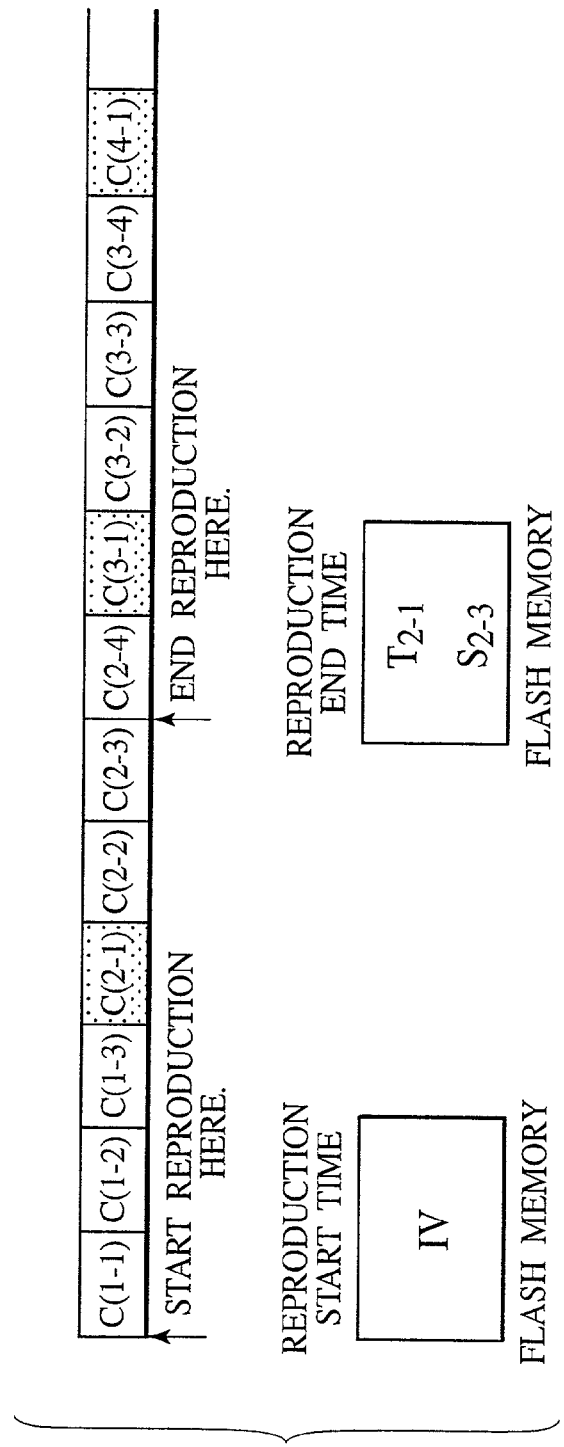
FIG. 12 is a diagram showing another method for reproducing contents encrypted by the encryption method according to the present invention.

Next, how to prevent a once-reproduced portion of the contents from being played back in a multiple-hierarchy-level configuration will be described. Assume that TS packets C(1-1) to C(2-3) will be reproduced as shown in FIG. 12. The initial value IV is recorded in the flash memory at the start of reproduction. When reproduction starts, the initial value IV is erased from the flash memory or moved later to the buffer as necessary. Then, after C(2-3) has been reproduced, $T_{2-1}$ and $S_{2-3}$ are recorded in the flash memory. $S_{2-3}$ is recorded to generate $K_{2-4}$ when there are no multiple hierarchy levels, that is, to allow reproduction to start from C(2-4). On the other hand, if the contents have been reproduced to C(2-3) and the next reproduction is to be started from C(4-1), the fastest random access to C(4-1) in the second hierarchy level is made in the order of $T_{2-1}\rightarrow$C(3-1)$\rightarrow$C(4-1). Therefore, $T_{2-1}$ is also recorded in the flash memory for random access. In addition, the contents may be either reproduced or random-accessed beginning with C(2-4).

Figure 13:
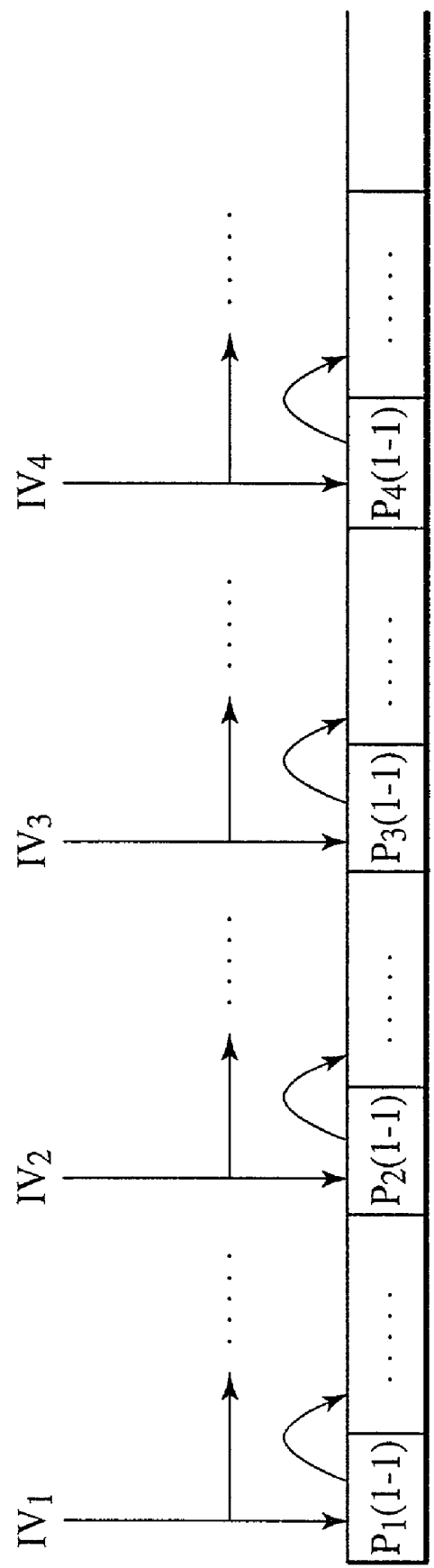
FIG. 13 is a diagram showing another example of encryption using the encryption method according to the present invention.

Recording "copy prohibited" digital contents on a hard disc recorder has been described. It should be noted that, although the unit block size in this embodiment is 184 bytes that correspond to the size of digital contents data in an MPEG-coded TS packet, the size might be changed according to the application. When the packets of the contents are chained as in FIGS. 7 and 8 and FIGS. 10 and 11, a data read error or a recording error that may occur during processing could prevent the contents from being reproduced correctly. If such an error occurs, the following chain of packets is affected. To prevent this condition, the chain beginning with the initial value IV may be reset multiple times in the same contents. For example, multiple initial values IVs shown in FIG. 13 reset the chain multiple times, preventing the error from being propagated.

Although only a hard disc recorder has been described in this embodiment, "copy prohibited" contents may be recorded to, and reproduced from, an optical disc recorder. In addition, although the contents cannot be accessed randomly, the present invention may be applicable to a tape recorder if the contents are reproduced from the start.

Recording and reproducing of "copy prohibited" contents have been described. The following describes a recording and reproducing apparatus, composed of a hard disc recorder and a digital VCR, as an example of a recording and reproducing apparatus capable of recording a program only to one separate medium when the digital contents data sent from a broadcasting station is "single-copy permitted". In the embodiment of the present invention, a recording and reproducing apparatus composed of a hard disc recorder and a digital VCR is provided to allow "single-copy permitted" contents to be recorded to a separate medium only once. MPEG-coded TS's are recorded on the hard disc of a hard disc recorder and on the videotape of a VCR. DES is used for encryption/decryption.

Figure 14:
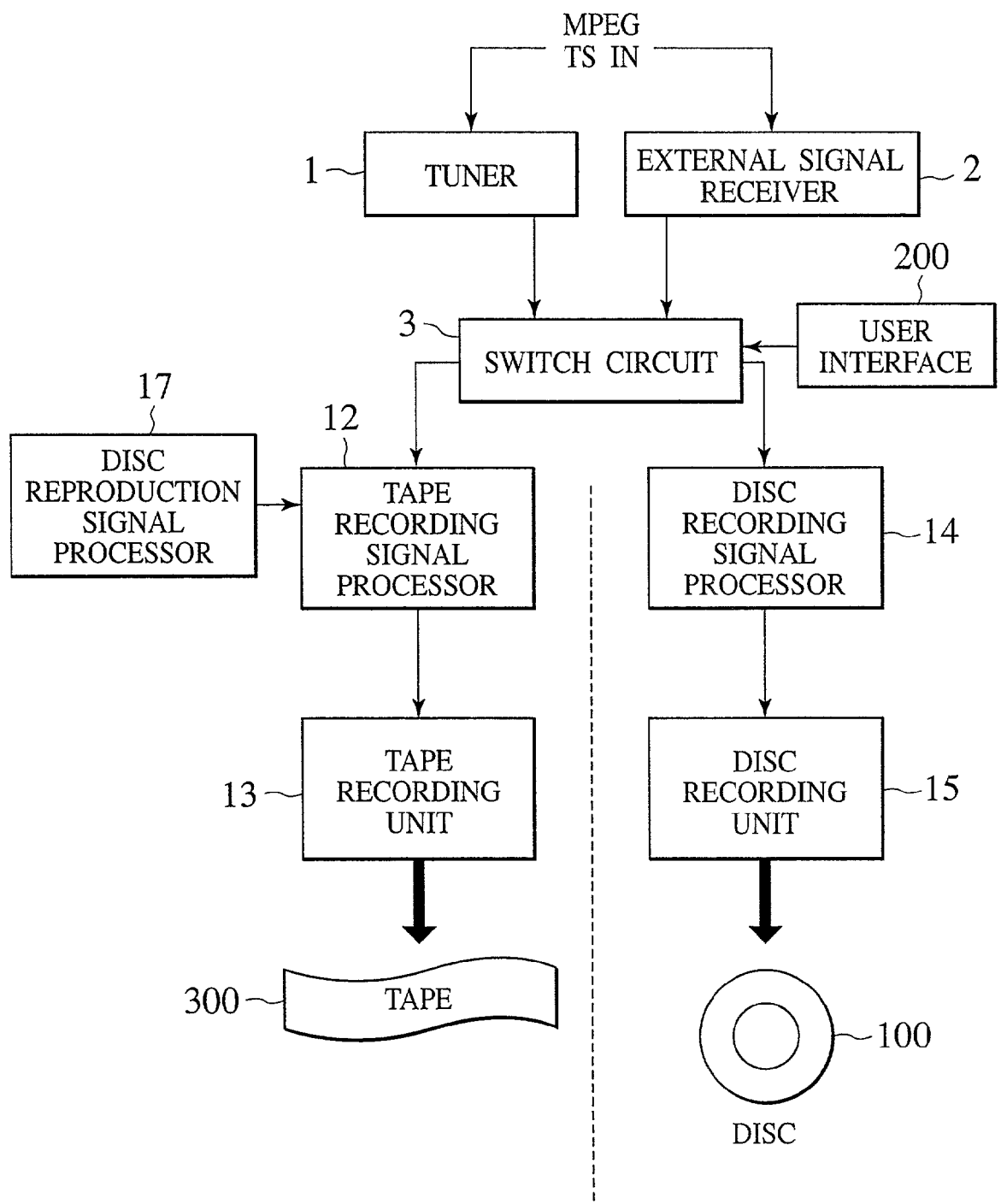
FIG. 14 is a block diagram showing a recording unit of a recording and reproducing apparatus, composed of a hard disc recorder and a digital VCR, to which the encryption method according to the present invention is applied.

FIG. 14 is a block diagram of a recording unit of a recording and reproducing apparatus, composed of a hard disc recorder and a digital VCR, in the embodiment of the present invention. In the figure, an MPEG TS packet is received via a tuner 1 or an external signal receiver 2 and is sent to a switch circuit 3. This circuit sends the signals either to a tape recording signal processor 12 or to a disc recording signal processor 14 in response to an instruction from a user interface 200. A time code, an absolute track number, and so on are generated for the signals sent to the tape recording signal processor 12. After that, the signals are sent to a tape recording unit 13 for digitally recording on a tape 300. Video signals and audio signals are recorded on the tape 300 with the time code, absolute track number, and so on, for example, in sub-code areas. For the signals sent to the disc recording signal processor 14, a time code and soon are generated. After that, the video signals are sent to the disc recording unit 15 for digitally recording on the disc 100. As on the tape, the video signals and the audio signals as well as the time code, absolute track number and so on, are recorded on the hard disc. A disc reproduction signal processor 17, which reproduces the signals recorded on the hard disc recorder, sends the reproduced signals to the tape recording signal processor 12 for copying data.

Figure 15:
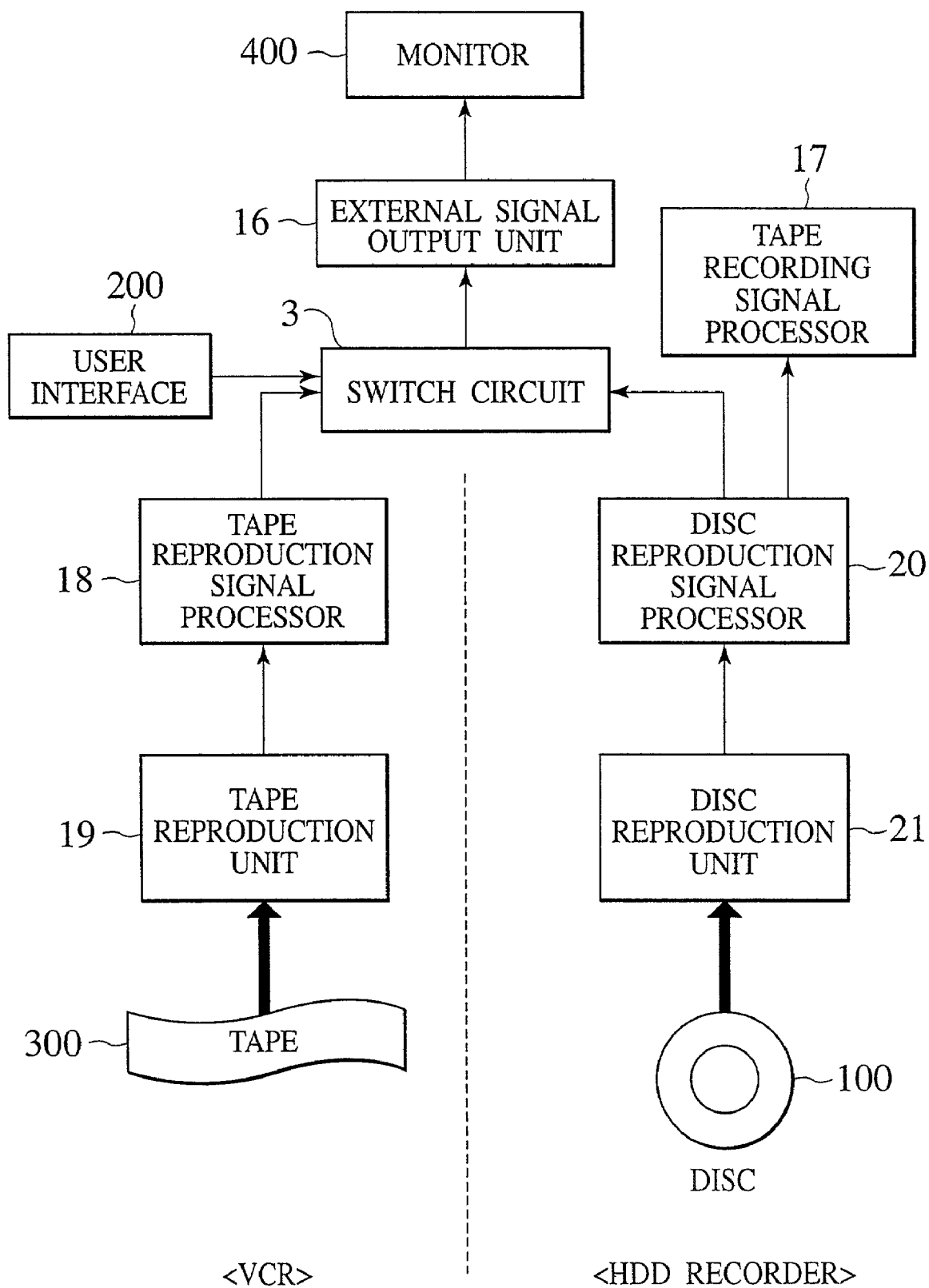
FIG. 15 is a block diagram showing a reproducing unit of a recording and reproducing apparatus, composed of a hard disc recorder and a digital VCR, to which the encryption method according to the present invention is applied.

FIG. 15 is a block diagram showing a reproducing unit of a digital signal recording and reproducing apparatus according to the present invention. When reproducing contents from a tape, a tape reproduction unit 19 reads signals from the tape 300 and sends the signals to a tape reproduction signal processor 18. The tape reproduction signal processor 18 performs error correction and so on and sends the signals to the switch circuit 3. When reproducing the contents from a disc, a disc reproduction unit 21 reads signals from the disc 100. The signals are sent to a disc reproduction signal processor 20, which performs error correction and so on and sends the signals to the switch circuit 3 and to a tape recording signal processor 17. Then, in response to an instruction from the user interface 200, the signals reproduced either from the tape 300 or from the disc 100 are output to a monitor 400 via an external signal output unit 16.

Next, how the recording and reproducing apparatus, composed of the hard disc recorder and the digital VCR with the configurations in FIGS. 14 and 15, records "single-copy permitted" digital contents data. "Single-copy permitted" signals are recorded via CGMS in the same way as "copy prohibited" signals. For example, a TS of digital broadcasting data includes a descriptor called a digital copy control descriptor which, in turn, includes a two-bit field containing digital recording control data (digital copy control information). Within that field is included control data having the value of, for example, "Copy Permitted"=00, "Single-Copy Permitted"=10, or "Copy Prohibited"=11. Upon detecting the two bits which contain "10" in the received signals, the recording and reproducing apparatus calculates the initial value IV=$h_i$(Const$_i$) with Const$_i$ as an input to the initial vector generation function $h_i$, where Const$_i$ is constant in the same contents. Thereafter, the contents are encrypted as with "copy prohibited" contents. In addition, unlike "copy prohibited" contents, "single-copy permitted" contents may be reproduced any number of times. Therefore, the key of "single-copy permitted" contents is erased only when they are recorded to a separate medium. For example, when the recording of C(1) to C(4) from the hard disc to a tape starts as shown in FIG. 9, the initial value IV is erased from the flash memory and, after the packets to C(4) have been recorded, seed $S_4$ is recorded in the flash memory. Therefore, although the initial value IV in the flash memory is referenced during reproduction, no data is recorded into, or erased from, the flash memory.

Figure 16:
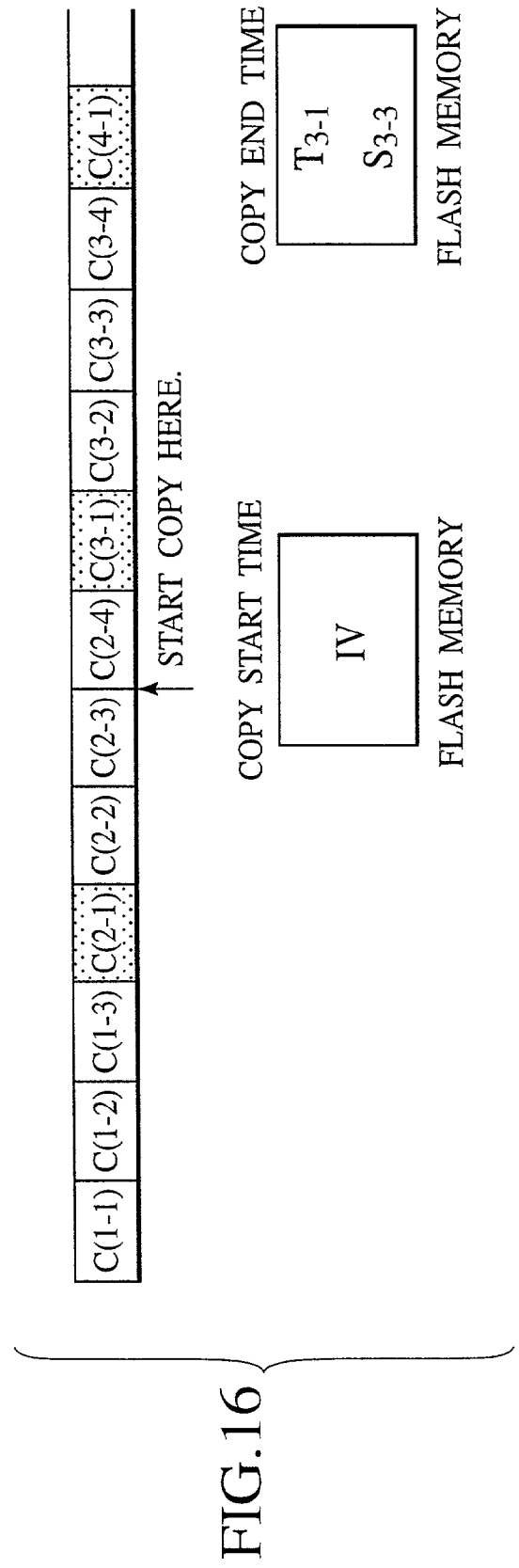
FIG. 16 is a diagram showing a method by which the recording and reproducing apparatus, composed of a hard disc recorder and a digital VCR, to which the encryption method according to the present invention is applied reproduces a portion of contents from the hard disc recorder and copies it to the digital VCR.

"Copy prohibited" contents are broadcast assuming that digital broadcasting PPV contents may basically be played back only once. If reproduction starts from an intermediate unit block, the reproduction of previous data is not permitted and, therefore, there is no need for considering it. However, a viewer may copy only a desired portion of "single-copy permitted" contents or may divide one unit of contents into several for copying onto multiple tapes. For example, as shown in FIG. 16, a viewer may copy C(2-4) and the following blocks and may reproduce the blocks preceding that block from the hard disc. To do so, the blocks beginning with C(2-4) are copied to a tape and, when unit block (2-4) is copied, the data of C(2-4) is erased or the data is rewritten to other data. The data in the flash memory is not rewritten. This prevents C(2-4) from being decrypted when the copy is finished because there is no data and, at the same time, prevents $K_{2-4}$ from being generated. However, because the initial value IV and C(2-1) remain unchanged, C(3-1) and the following blocks may be decrypted by tracing the initial value IV→C(2-1)→C(3-1)→. Therefore, to prevent this, when the blocks are copied up to C(3-1), C(2-4) as well as C(3-1) is erased. This prevents C(3-2) and the following blocks from being reproduced. Also, when copying blocks C(2-4) to C(3-3), the above described methods may be combined. That is, C(2-4) and C(3-1) are erased, and $T_{3-1}$ and $S_{3-3}$ are recorded into the flash memory.

Figure 17:
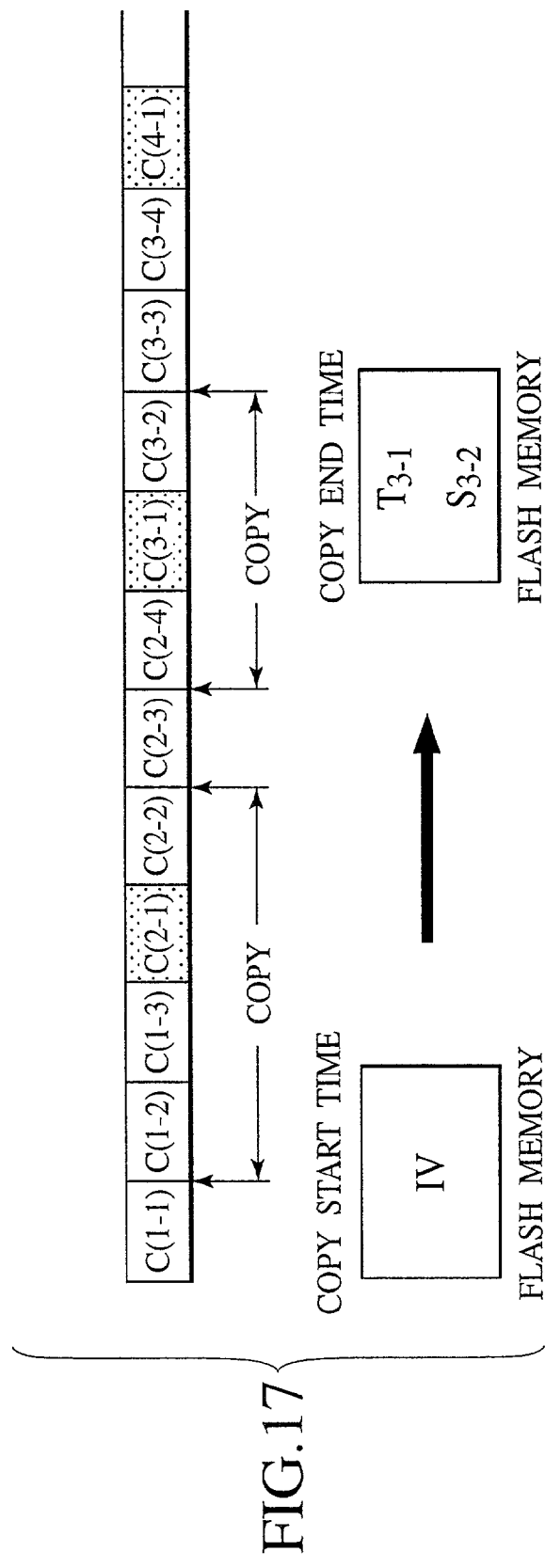
FIG. 17 is a diagram showing another method by which the recording and reproducing apparatus, composed of a hard disc recorder and a digital VCR, to which the encryption method according to the present invention is applied reproduces a portion of contents from the hard disc recorder and copies it to the digital VCR.

Now, consider how two portions of the blocks, that is, C(1-2) to C(2-2) and C(2-4) to C(3-2), are copied from a hard disc to a tape as shown in FIG. 17. In this case, multiple IN points and OUT points are specified before the copy starts and, when the copy ends, the initial value IV in the flash memory are rewritten to $T_{3-1}$ and $S_{3-2}$ as with "copy prohibited" contents. This allows block C(3-3) and the following blocks to be reproduced from the hard disc and, at the same time, prevents C(3-2) and preceding blocks from being reproduced because the initial value IV is erased from the flash memory. As described above, the same function may be implemented also for "single-copy permitted" contents.

Recording of "single-copy permitted" digital contents on a recording and reproducing apparatus composed of a hard disc recorder and a digital VCR has been described. In the above description, only a recording and reproducing apparatus composed of a hard disc recorder and a digital VCR has been described. However, when contents are "single-copy permitted" contents, the hard disc drive may be replaced by any random access unit such as an optical disc recorder, and the VCR may be replaced by any recording unit.

As detailed above, although "copy prohibited" contents may conventionally be played back only during the broadcasting time, the encryption method, decryption method, and recording and reproducing apparatus according to the present invention allow a viewer to play them back only once at any desired time. In addition, after recording "single-copy permitted" contents on a medium, a viewer may copy them to a separate medium only once and edit them. At this time, data on a hard disc is encrypted for security. In addition, when "copy prohibited" contents are viewed to an intermediate point, the seed of the decryption key used up to that point is erased to prevent the portion to that intermediate point from being reproduced. Similarly, a portion of "single-copy permitted" contents, which is already copied to a separate medium, may not be reproduced. In addition, to prevent any predetermined unit block and the following blocks from being reproduced, the method according to the present invention uses, for the seed of the encryption key, plain text other than that for the predetermined unit block, encrypted text produced by encrypting a unit block other than the predetermined unit block, or an encryption key for encrypting a unit block other than the predetermined unit block. Chaining blocks significantly reduces the amount of seed information on the keys that must be recorded. It should be noted that, when the seed of an encryption key is an encryption key used for encrypting a unit block other than the predetermined unit block, the number of bits is less than when the seed of the encryption key is plain text or encrypted text and, in addition, processing becomes simpler.

It should be understood that many modifications and adaptations of the invention will become apparent to those skilled in the art and it is intended to encompass such obvious modifications and changes in the scope of the claims appended hereto.

What is claimed is:

1. An encryption method for encrypting information including a plurality of continuous unit blocks having a reproduction order, said plurality of unit blocks being encrypted one unit block at a time,
    wherein a seed of an encryption key for encrypting a unit block is based on one or more unit blocks that are, in the reproduction order, before the unit block or on information generated by encrypting one or more unit blocks before the unit block,
    wherein the seed of the encryption key is chained at least twice,
    wherein an initial value IV of a seed of an encryption key used for encrypting a first unit block of the plurality of unit blocks having the reproduction order is stored,
    wherein the chain has a plurality of hierarchy levels, a first hierarchy level is encrypted based on the initial value IV of the seed of the encryption key, and a second and higher hierarchy levels are encrypted based on a seed of an encryption key at a lower hierarchy level,
    wherein, when encrypted unit blocks from the first unit block to any given unit block of the encrypted information are decrypted for reproduction, the initial value IV of the seed of the encryption key that was stored is used, and
    wherein, when the reproduction of the unit blocks to the given unit block ends, the initial value IV of the seed of the encryption key that was stored is erased and both a seed of an encryption key used for encrypting a unit block follows the given unit block in the reproduction order and a seed of an encryption key used for encrypting a unit block at another hierarchy level after the given unit block are stored.

2. The encryption method according to claim 1 wherein the chain is reset when the seed is chained a predetermined number of times.

3. A decryption method for decrypting information including a plurality of continuous encrypted unit blocks having a reproduction order, said plurality of encrypted unit blocks being encrypted one unit block at a time,
    wherein a seed of an encryption key for decrypting an encrypted unit block is based on one or more unit blocks that are, in the reproduction order, before the unit block or on information generated by encrypting one or more unit blocks before the unit block,
    wherein the seed of the encryption key is chained at least twice, wherein an initial value IV of a seed of an encryption key used for encrypting a first unit block of the plurality of unit blocks having the reproduction order is stored, wherein the chain has a plurality of hierarchy levels, a first hierarchy level is encrypted based on the initial value IV of the seed of the encryption key, and a second and higher hierarchy levels are encrypted based on a seed of an encryption key at a lower hierarchy level, wherein, when encrypted unit blocks from the first unit block to any given unit block of the encrypted information are decrypted for reproduction, the initial value IV of the seed of the encryption key that was stored is used, and wherein, when the reproduction of the unit blocks to the given unit block ends, the initial value IV of the seed of the encryption key that was stored is erased and both a seed of an encryption key used for encrypting a unit block that follows the given unit block in the reproduction order and a seed of an encryption key used for encrypting a unit block at another hierarchy level after the given unit block are stored.

4. The decryption method according to claim 3 wherein the chain is reset when the seed is chained a predetermined number of times.

5. A recording and reproducing apparatus comprising:

encrypting means for encrypting information including a plurality of continuous unit blocks having a reproduction order, one unit block at a time;

recording means for recording the encrypted information on a recording medium; and decrypting means for decrypting the plurality of encrypted unit blocks for reproduction, one unit block at a time, which are the encrypted information read from said recording medium, wherein a seed of an encryption key for encrypting a unit block and a seed of an encryption key for decrypting an encrypted unit block are based on one or more unit blocks that are, in the reproduction order, before the unit block or on information generated by encrypting one or more unit blocks before the unit block, and wherein the seed of the encryption key is chained at least twice, the recording and reproducing apparatus further comprising:

storage means for storing an initial value IV of a seed of an encryption key used for encrypting a first unit block of the plurality of unit blocks having the reproduction order, wherein the chain has a plurality of hierarchy levels, a first hierarchy level is encrypted based on the initial value IV of the seed of the encryption key, and a second and higher hierarchy levels are encrypted based on a seed of an encryption key at a lower hierarchy level, wherein, when encrypted unit blocks from the first unit block to any given unit block of the encrypted information are decrypted for reproduction, the initial value IV of the seed of the encryption key that stored in said storage means is used, and wherein, when the reproduction of the unit blocks to the given unit block ends, the initial value IV of the seed of the encryption key is erased from said storage means and both a seed of an encryption key used for encrypting a unit block that follows the given unit block in the reproduction order and a seed of an encryption key used for encrypting a unit block at another hierarchy level after the given unit block are stored in said storage means.

6. A recording and reproducing apparatus comprising:

encrypting means for encrypting information including a plurality of continuous unit blocks having a reproduction order, one unit block at a time;

recording means for recording the encrypted information on a recording medium; and decrypting means for decrypting the plurality of encrypted unit blocks for reproduction, one unit block at a time, which are the encrypted information read from said recording medium, wherein a seed of an encryption key for encrypting a unit block and a seed of an encryption key for decrypting an encrypted unit block are based on one or more unit blocks that are, in the reproduction order, before the unit block or on information generated by encrypting one or more unit blocks before the unit block.

the recording and reproducing apparatus further comprising:

storage means for storing an initial value IV of a seed of an encryption key used for encrypting a first unit block of the plurality of unit blocks having the reproduction order, wherein the initial value IV of the seed of the encryption key stored in said storage means is used when the first unit block of the plurality of unit blocks encrypted by said encrypting means and having the reproduction order is decrypted for reproduction.

7. A recording and reproducing apparatus comprising:

encrypting means for encrypting information including a plurality of continuous unit blocks having a reproduction order, one unit block at a time;

recording means for recording the encrypted information on a recording medium; and decrypting means for decrypting the plurality of encrypted unit blocks for reproduction, one unit block at a time, which are the encrypted information read from said recording medium, wherein a seed of an encryption key for encrypting a unit block and a seed of an encryption key for decrypting an encrypted unit block are based on one or more unit blocks that are, in the reproduction order, before the unit block or on information generated by encrypting one or more unit blocks before the unit block, the recording and reproducing apparatus further comprising:

storage means for storing an initial value IV of a seed of an encryption key used for encrypting a first unit block of the plurality of unit blocks having the reproduction order, wherein, when encrypted unit blocks from the first unit block to any given unit block, which are the encrypted information, are decrypted for reproduction, the initial value IV of the seed of the encryption key that was stored in said storage means is used, and wherein, when the reproduction of the unit blocks to the given unit block ends, the initial value IV of the seed of the encryption key is erased from said storage means and a seed of an encryption key used for encrypting a unit block that follows the given unit block in the reproduction order is stored.

8. The recording and reproducing apparatus according to claim 5, wherein the chain is reset when the seed is chained a predetermined number of times.

* * * * *